United States Patent
Luu et al.

(10) Patent No.: US 7,256,788 B1
(45) Date of Patent: Aug. 14, 2007

(54) GRAPHICS POWER SAVINGS SYSTEM AND METHOD

(75) Inventors: Viet-Tam Luu, San Jose, CA (US); Paul Puey, Union City, CA (US); Nick B. Triantos, Woodside, CA (US); Andrew Webster, Waterloo (CA)

(73) Assignee: Nvidia Corporation, Santa Clara, CA (US)

( * ) Notice: Subject to any disclaimer, the term of this patent is extended or adjusted under 35 U.S.C. 154(b) by 236 days.

(21) Appl. No.: 10/171,232

(22) Filed: Jun. 11, 2002

(51) Int. Cl.
  *G06T 1/00*   (2006.01)
  *G06T 15/00*  (2006.01)
  *G06F 1/30*   (2006.01)
  *G06F 1/26*   (2006.01)
  *G06F 1/32*   (2006.01)
  *G06F 1/28*   (2006.01)
  *G06F 15/16*  (2006.01)

(52) U.S. Cl. .................. 345/501; 345/522; 345/211; 713/320; 713/323; 713/324; 713/340

(58) Field of Classification Search .............. 345/501, 345/211, 212, 214, 537, 204, 418, 428, 581–582, 345/522; 713/300, 320–324, 330, 340, 375, 713/310, 401, 500
See application file for complete search history.

(56) References Cited

U.S. PATENT DOCUMENTS

| 5,396,443 | A | * | 3/1995 | Mese et al. ............... 713/321 |
| 5,590,342 | A | * | 12/1996 | Marisetty ................ 713/324 |
| 6,360,327 | B1 | * | 3/2002 | Hobson .................. 713/300 |
| 2002/0099964 | A1 | * | 7/2002 | Zdravkovic .............. 713/320 |
| 2004/0032414 | A1 | * | 2/2004 | Jain et al. ............... 345/502 |
| 2005/0268141 | A1 | * | 12/2005 | Alben et al. ............. 713/500 |

* cited by examiner

*Primary Examiner*—Wesner Sajous (57) ABSTRACT

The present invention facilitates utilization of flexible and efficient power savings in graphics systems. A graphics power management method loads a first set of graphics commands from a CPU into a GPU at the beginning of a frame cycle. The CPU is put into a power saving mode after the loading is complete. The GPU processes the commands and forwards the results to a graphics buffer. The display begins the presentation of the data at the beginning of the following refresh cycle. The CPU leaves the power savings mode at end of the frame cycle to begin loading a second set of commands. The CPU recognizes the end of the frame cycle by counting a predetermined number of frame flip interrupt requests. After the CPU counts the predetermined number of frame flip interrupt requests the CPU begins to communicate additional graphics commands and then returns to the power savings mode.

21 Claims, 5 Drawing Sheets

GRAPHICS POWER SAVINGS SYSTEM AND METHOD

FIELD OF THE INVENTION

The present invention relates to the field of power savings in electronic devices. More particularly, the present invention relates to a system and method for saving power when engaging in graphics activities.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Typically, electronic systems designed to produce these results consume power. However, energy resources for these devices are often limited and expended quickly (e.g., battery power sources in portable devices such as a laptop computer). Some activities such as displaying graphics usually require intensive data processing and traditionally consume large amounts of power, significantly draining the resources and/or reducing the life of a typical limited power source.

Computer systems are typically utilized to process information and users typically desire to see the results of the processing. A display monitor is one of the most common mechanisms for presenting processing results to a user. Displaying information in a visual presentation is usually a convenient and effective method of conveying the information. However, typical graphics presentations usually require significant processing of large amounts of data which traditionally consumes significant power.

Numerous different types of display devices are utilized to convey information. Display devices such as cathode ray tube (CRT) devices and field emission display (FED) devices usually generate light by impinging high-energy electrons on a picture element (pixel) of a phosphor screen and the phosphor converts the electron energy into visible light utilized to convey images to observers. Displays such as cathode ray tubes (CRTs) and field emission devices (FEDs) usually differ in the manner in which the high energy electrons are impinged on a pixel. Conventional CRT displays typically use electron beams to scan across the phosphor screen in a raster, pattern. FEDs usually utilize stationary electron beams for each color element of a pixel. Despite the differences in the way the high energy beams are impinged on a pixel, the format in which image information is provided to the displays is usually similar.

The image information is presented on the display screen in accordance with a typical fundamental "raster" display process. Typically, information on the brightness level for each primary color (e.g., red, blue and green) in a pixel is provided for each pixel included in the display. Pixels are usually arranged in a matrix of rows and columns with each pixel having a unique identifier (e.g., row and column indicator). The display "illuminates" each pixel in accordance with illumination data assigned to a corresponding pixel identifier. The pixels are illuminated in a "raster" pattern that usually starts at the top of the display and goes across the display from left to right on each row and then drops to the row below until it reaches the bottom. When the display process gets to the last pixel at the bottom, there is a very short "blank" period for a vertical retrace to return back to the starting pixel at the top of the display. The speed at which the display illuminates the pixels of the display and returns to the top is called the refresh rate.

The preparation of the pixel illumination information is usually a very complicated process and often best performed by dedicated graphics subsystem resources. Providing information for each pixel is very data intensive and consumes a significant amount of processing resources calculating the appropriate intensity of each color for each pixel. Computer systems typically perform a wide range of tasks with highly differentiated processing needs. Some of these tasks are often performed by separate processors in an effort to relieve a central processor from having to perform all the tasks. For example, graphics processors are often provided to perform special graphics processing. The separate graphics processors relieve the central processor of performing many of the graphics processing activities. In addition, dedicated graphics subsystems are usually specifically configured for maximized performance of graphics activities enabling a graphics processor to perform many graphics operations faster and more efficiently than a central processor, which is typically configured for more generalized processing operations.

Even though a graphics processor relieves a central processor from performing numerous complicated graphics operations, traditionally a significant amount of interaction between the graphics processor and the central processor is required. The central processor provides commands to the graphics processor which processes the commands to generate image display information (e.g., pixel illumination data). Even though the graphics processor usually performs most of the graphics processing, traditional interactions between the central processor and the graphics processor usually consume significant power. Traditionally a central processor provides commands to the graphics processor and then continuously requests or "polls" the graphics processor to determine if the graphics processor has completed processing associated with the commands and is ready to accept more commands. For example, some traditional central processors enter a processing loop that continuously reads the value in a hardware register until the value indicates the GPU is ready for additional commands. Since it typically takes a graphics processor some time to process the graphics commands associated with a particular frame, the majority of the responses to the CPU inquiry indicate the GPU is not ready. When the GPU is not ready for additional commands the CPU continually "polls" the GPU and the polling consumes significant power without really contributing to the underlying processing tasks.

SUMMARY

The present invention facilitates utilization of flexible and efficient power savings in graphics systems during graphic frame cycles. In one embodiment, each graphics frame cycle spans an integral number of display refresh cycles and is broken into essentially two "phases", a rendering phase and a refresh phase. In one exemplary implementation, a central processing unit (CPU) forwards graphics commands to a graphics processing unit (GPU). After issuing the graphics generation commands, the CPU is not performing significantly useful graphics activity and the CPU is put to into a power savings mode (e.g. to "sleep") until a GPU is ready for more graphics commands.

In one embodiment, a graphics power management method loads a first set of graphics commands from a CPU into a GPU at the beginning of a frame cycle. The CPU is put into a power saving mode (e.g., an application thread using the graphics system is put to sleep) after the loading is complete. The GPU processes the commands and forwards the results to a graphics buffer. The display begins the presentation of the data at the beginning of the following refresh cycle. The CPU leaves the power savings mode (e.g., wakes up) at end of the frame cycle to begin loading a second set of commands. In one embodiment of the present invention, the CPU recognizes the end of the frame cycle by counting a predetermined number of frame flip interrupt requests. After the CPU counts the predetermined number of frame flip interrupt requests the CPU begins to communicate additional graphics commands and when finished returns to the power savings mode. In one exemplary implementation, a mechanism (e.g., a graphical user interface) is provided to change the predetermined number of frame flip interrupt requests.

DETAILED DESCRIPTION

Reference will now be made in detail to the preferred embodiments of the invention, a power saving system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention is directed towards reducing power consumption during graphic frame cycles. In one embodiment, each graphics frame cycle is broken into essentially two "phases", a rendering phase and a refresh phase. The frame cycle spans an integral number of display refresh cycles. In one exemplary implementation, the rendering phase includes a central processing unit (CPU) issuing commands to a graphics processing unit (GPU) and the GPU filling up a graphics buffer with pixel information. The refresh phase begins when the information from the graphics buffer is displayed and continues for a predetermined number of refresh cycles in which the image display is refreshed. After issuing the graphics generation commands, the CPU is not performing significantly useful graphics activity for the duration of the graphics frame cycle and the CPU is put to into a power savings mode (e.g. to "sleep") for substantial portions of the remaining frame cycle. The CPU awaits an indication (e.g., an interrupt signal) that the GPU is ready to receive a second graphics data set (e.g., the GPU has completed rendering operations on the first graphics data set). Thus, the CPU does not consume power in continuous polling of the GPU to determine if the GPU is ready for additional graphics information.

Figure 1:
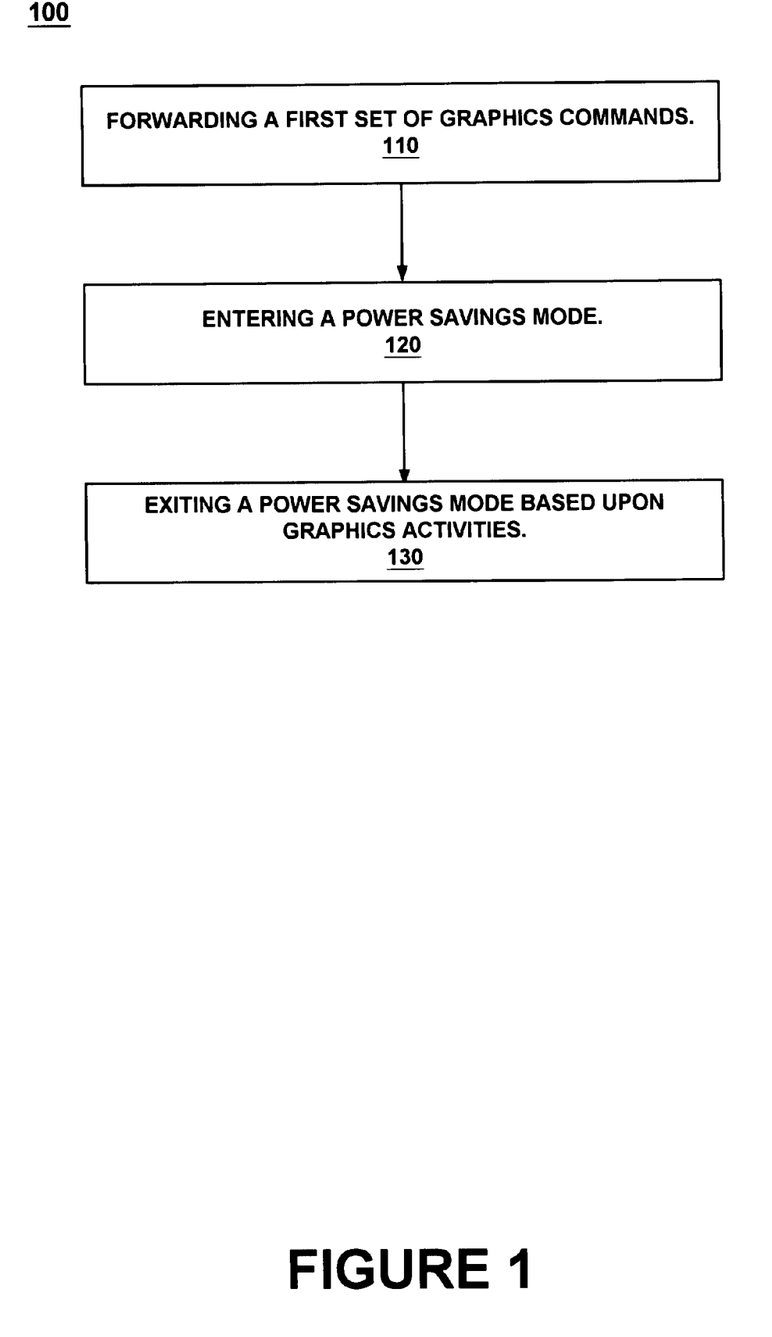
FIG. 1 is a flow chart of graphics power savings method, one embodiment of the present invention.

FIG. 1 is a flow chart of graphics power savings method 100, one embodiment of the present invention. Graphics power savings method 100 facilitates power conservation during graphics operations. In one embodiment of graphics power savings method 100, a power savings mode is utilized to reduce power consumption by a central processing unit while a graphics subsystem performs graphics operations.

In step 110, a first set of graphics commands are forwarded. In one embodiment of the present invention, the first set of graphics commands are forwarded from a central processing unit to a graphics subsystem. The first set of graphics commands include directions associated with the display of a first graphics frame in one exemplary implementation of the present invention.

In step 120, a power savings mode is entered. In one embodiment of the present invention, a central processing unit enters the power savings mode. For example, an operating system is requested to engage in a sequence that causes the CPU to wind down and consume less energy during the period of time for which the CPU is not required to participate in application activities (e.g., activities associated with graphics presentation).

Figure 2:
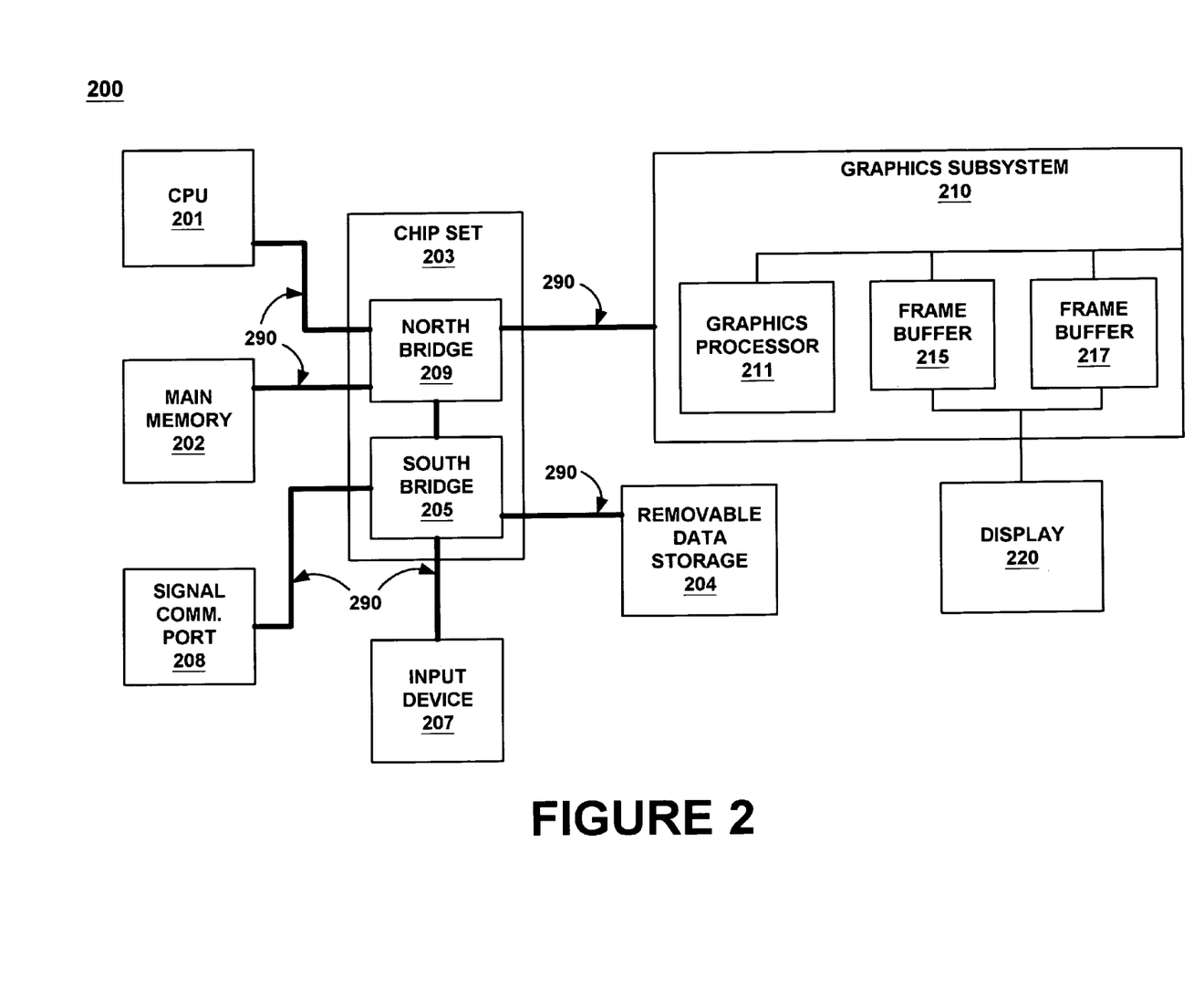
FIG. 2 is a block diagram of power savings computer system, one embodiment of a computer system upon which the present invention is implemented.

At step 130, the power savings mode is exited based upon graphics activities. In one embodiment, a central processing unit exits the power savings mode in time to provide additional graphics information to a graphics subsystem (e.g., a graphics processing unit) so that graphics presentation operations continue smoothly. For example, the CPU exits the power savings mode and forwards a second set of graphics commands to a GPU. In one exemplary implementation, an indication from the GPU (e.g., an interrupt) to exit the power savings mode is received by the CPU and the CPU forwards a second set of graphics commands FIG. 2 is a block diagram of power savings computer system 200, one embodiment of a computer system upon which the present invention is implemented. Computer system 200 includes communication bus 290, central processor unit 201, main memory 202 (e.g., random access memory), chip set 203 with north bridge 209 and south bridge 205, removable data storage device 204, input device 207, signal communications port 208, and graphics subsystem 210 which is coupled to display 220. Communication bus 290 couples chipset 203 to central processor unit 201, main memory 202, removable data storage device 204, input device 207, signal communications port 208 and graphics subsystem 210. Graphics subsystem 210 includes graphics processor 211 and graphics buffers 215 and 217. In one embodiment additional graphics buffers are provided to increase performance.

The components of computer system 200 cooperatively function to provide a variety of functions, including processing of graphics information in an efficient power conservation manner. Communications bus 290 communicates information, central processor 201 processes information and engages in a power conservation during graphics operations, main memory 202 stores information and instructions for the central processor 201. Removable data storage device 204 also stores information and instructions (e.g., functioning as a large information reservoir). Input device 206 provides a mechanism for inputting information and/or for pointing to or highlighting information on display 220. Signal communication port 208 provides a communication interface to exterior devices (e.g., an interface with a network). Display device 209 displays information in accordance with data stored in graphics buffers 215 and 217. Graphics processor 211 processes graphics commands from central processor 201 and provides the resulting data to graphics buffers 215 and 217 for storage and retrieval by display monitor 220.

Power savings computer system 200 implements power savings measures during graphics operations. Central processor 201 goes into a reduced power state after delivering each set of graphics commands to graphics processor 211. In one embodiment of the present invention, a reduced power state includes a sleep period in which central processor 201 winds itself down to consume less power. For example, going to sleep includes putting an application thread running on the CPU to sleep (e.g. an application thread using the graphics subsystem 210). The CPU enters an idle state and monitors for a "wakeup" indication (e.g., an interrupt signal). In one implementation, graphics processor 211 forwards an indication to central processor 201 indicating that graphics processor 211 is ready to receive additional graphics commands.

In one embodiment of the present invention, central processor 201 enters a sleep mode in which it executes an idle routine. The idle routine enables central processor 201 to remain substantially asleep while monitoring interrupt signals from graphics subsystem 210. The sleep mode (a.k.a. "pseudo" sleep mode) idle routine consumes significantly less power than traditional polling operations associated with continuous running of graphics device driver routines. In one exemplary implementation, the idle routine activates an interrupt handling routine that counts graphics frame buffer (e.g., 215 and 217) flip interrupt service routine requests to start displaying a new graphics buffer. For example, the interrupt handling routine monitors for an interrupt pulse signal, increments an interrupt count when an interrupt pulse signal is detected, compares the count to a predetermined value and restores central processor 201 to a normal wake state if the count and the predetermined value match. The interrupt handling routine is a very simple and quick and does not consume much power.

Figure 4:
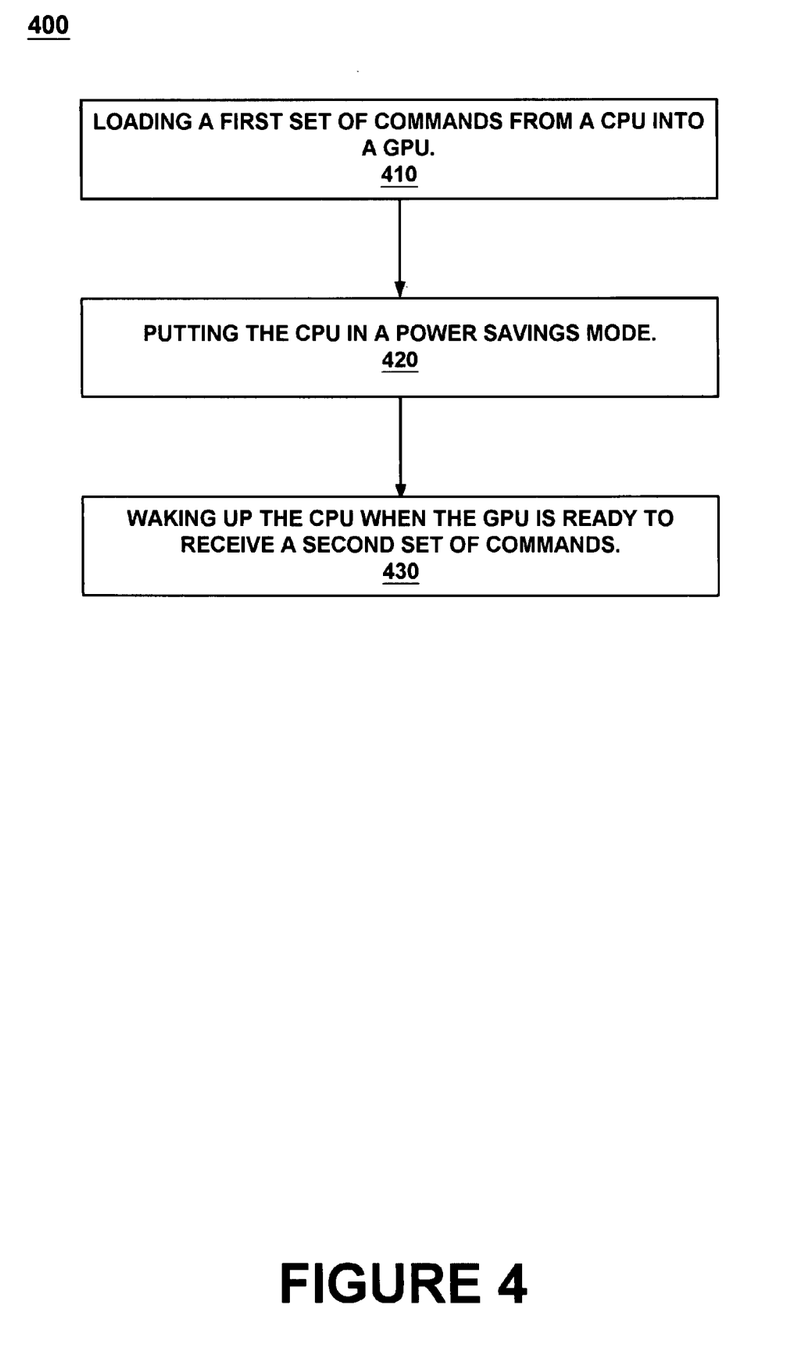
FIG. 4 is a flow chart of a graphics power management method in accordance with one embodiment of the present invention.

FIG. 4 is a flow chart of graphics power management method 400, one embodiment of a present invention graphics power management method. Graphics power management method 400 facilitates reducing power consumed by processes for informing a central processor that a graphics processor is ready to receive additional graphics commands.

In step 410, a first set of commands from a CPU is loaded into a GPU. In one embodiment of the present invention, the first set of commands are loaded at the beginning of a graphics frame cycle. A graphics frame cycle is a cycle of graphics activities that occur between the beginning of communicating a first set of graphics commands to the beginning of communicating a second set of graphics commands and occupies a time period between CPU command loads over one or more display refresh cycles (See graphics frame cycle for frame A depicted in FIG. 3).

In step 420, the CPU is put in a power savings mode (e.g., to sleep) after the first set of commands are loaded in the GPU. In one embodiment of the present invention, there are periods of time after the CPU sends the graphics commands in which the CPU is not being utilized to perform application operations and the operating system is requested to implement power reducing measures. For example, the operating system is requested to put to sleep an application thread that generated the first set of commands. In one embodiment, the CPU continues to perform processing for operations associated with other threads or activities unrelated to the application using the graphics system. In one exemplary implementation, the power saving mode includes very small periods of time in which a minimal amount of power is consumed by the central processing unit for very specific minimal graphics operations.

In one embodiment of graphics power management method 400, the CPU "partially" (e.g. temporarily) wakes up in response to refresh interrupt signal and very quickly determines an appropriate response without consuming much power. For example, the CPU determines if it should go back to sleep or if it should "fully" wake up and perform driver operations associated with communicating graphics data to a GPU. It is convenient for the CPU to track the refresh interrupt signals because there is a ratio relationship between the rendering activities initiated by the CPU commands and the display refresh activities. The rendering activities occur once in every integer multiple of refresh cycles (e.g., one render for every three refresh cycles) and thus the CPU "partially" wakes up and counts the refresh interrupt signals so it knows when to issue the next set of rendering phase graphics commands. This waking up to check the refresh counter consumes less energy than the traditional CPU polling of the GPU.

In step 430, the CPU is awakened when the GPU is ready to receive more commands. In one embodiment of the present invention, the CPU is awakened at the end of a frame cycle to begin loading a second set of graphics commands. In one exemplary implementation, a single interrupt signal is forwarded to the CPU to trigger the CPU wake up, after which the CPU engages in a variety of activities including driving a second set of graphic commands for the GPU. In another exemplary implementation, an interrupt count mechanism (e.g., a refresh cycle tracking process) is utilized to determine when the CPU is woke up and a second set of graphic commands are sent to the GPU.

In one implementation of step, 420 and 430, a refresh cycle tracking component (e.g., an interrupt counter) of the CPU is activated at the beginning of a refresh cycle (e.g. by receiving a graphics frame flip interrupt signal). The CPU is placed back to sleep if the refresh cycle tracking component does not indicate a frame cycle is complete. The CPU begins loading a second set of commands if the refresh cycle tracking component does indicate a frame cycle is complete (e.g., a sufficient number of refresh interrupt signals are counted).

Figure 3A:
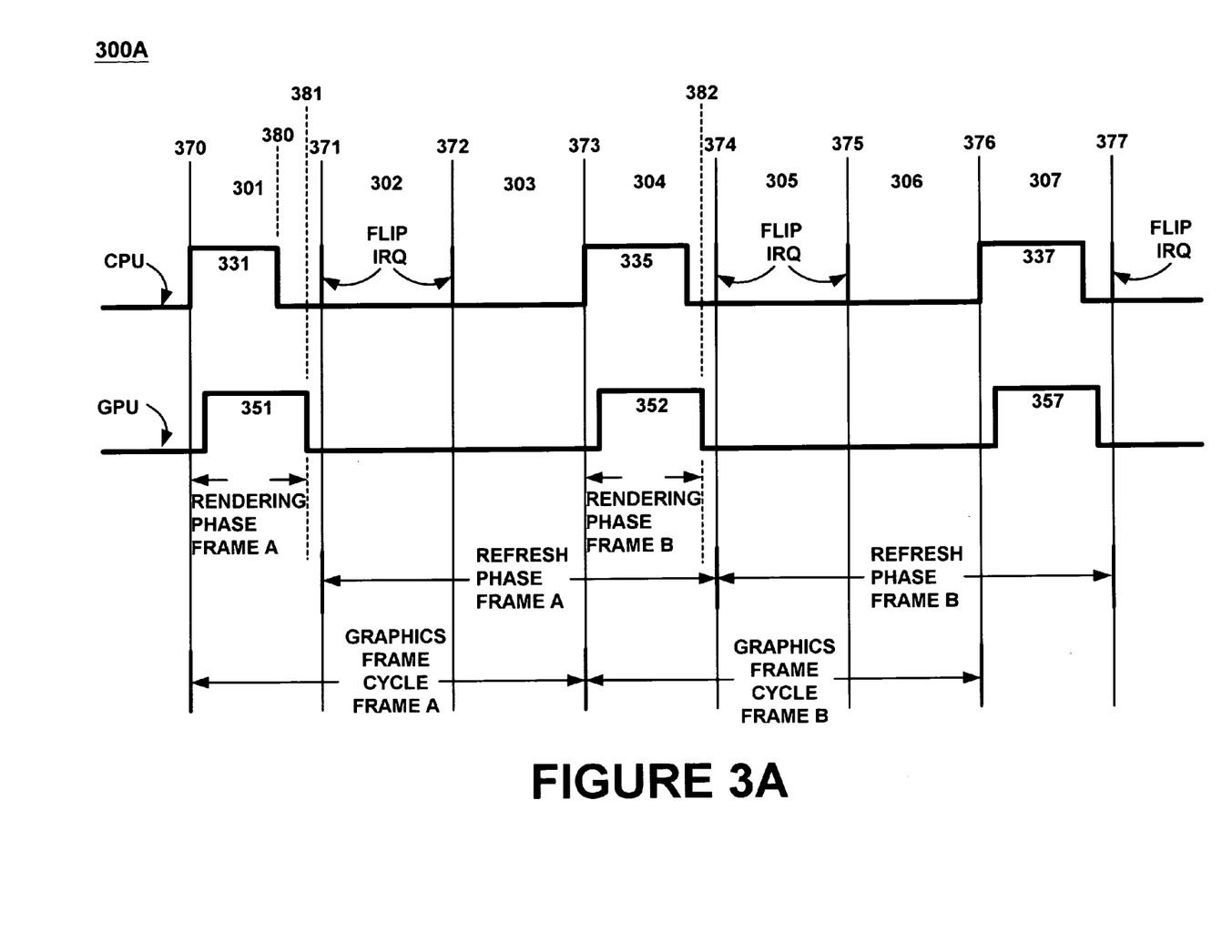
FIG. 3A is a timing diagram showing the relative occurrence of events in one exemplary implementation of the present invention.

FIG. 3A is a timing diagram showing the relative occurrence of events in one exemplary implementation of the present invention. Refresh cycles 301 through 307 indicate the rate at which a scene or image presented on a display monitor is refreshed. At the beginning of refresh cycle 301 (time 370) a CPU sends graphics commands 331 to a GPU. Shortly after the graphics commands 331 are received, the GPU processes the commands and generates graphics data 351 which is forwarded to a frame buffer. The GPU processes the commands and forwards the resulting pixel data to the frame buffer before the refresh cycle 301 is complete. In the mean time, the CPU is put to sleep after completing the communication of graphics command 331 (e.g., at time 380). In one embodiment of the present invention, putting the CPU to sleep includes putting an application thread that is utilizing the graphics system to sleep in the CPU. In one exemplary implementation, a CPU enters an idle state and when interrupt signals are received from the graphics system an interrupt handling service is activated. The process of the CPU sending graphics commands and going to sleep is repeated for each set of graphics commands generated by the CPU (e.g., 335, 337, etc).

In one embodiment, the time period beginning with the sending of the commands to the end of the GPU processing the commands is referred to as the rendering phase. For example the time period from time 370 to 381 is the rendering phase for frame A and the time for period from time 373 to 382 is the rendering phase for frame B. In one exemplary implementation, a GPU processes the commands from the CPU and forwards the results to a frame buffer during a rendering phase and waits for additional commands between the rendering phases. The first flip interrupt request signal at time 371 is triggered at the end of refresh cycle 301. At the end of refresh cycle 301 (time 371) refresh phase A begins in which frame A is displayed for three refresh cycles (e.g., until the end of refresh cycle 304 at time 374).

At the beginning of refresh cycle 304 the CPU is awakened by the communication of an interrupt signal at time 373 and begins to download more graphics commands to the GPU. The next rendering phase for frame B and the graphics frame cycle for frame B are initiated at the beginning of refresh cycle 304 (time 373). After the end of refresh cycle 304 (time 374)refresh phase B begins in which frame B is displayed for three refresh cycles (e.g., until the end of refresh cycle 307 at time 377).

It is appreciated that the present invention is readily adaptable to a variety of implementations. For example, in one embodiment a single indication (e.g. a single interrupt signal) causes the CPU to exit a power savings mode at the end of each graphics frame cycle (e.g., at times 373 and 376) and the CPU does not track intervening interrupt signals (e.g. at times 371, 372, 374 and 375). In the another exemplary implementation, the CPU checks an interrupt signal counter at the beginning of refresh cycle 301 (time 370) and resets the interrupt counter to zero. The CPU is then partially awakened at the next interrupt signal (time 371), increments the interrupt signal counter by one and goes back to sleep. The CPU repeats the count process again at the next indication of an interrupt signal (e.g. at time 372) until the counter has been incremented to match a predetermined number of refresh cycles per frame. The CPU then wakes up (e.g. at time 373) and provides additional commands to the GPU.

Figure 3B:
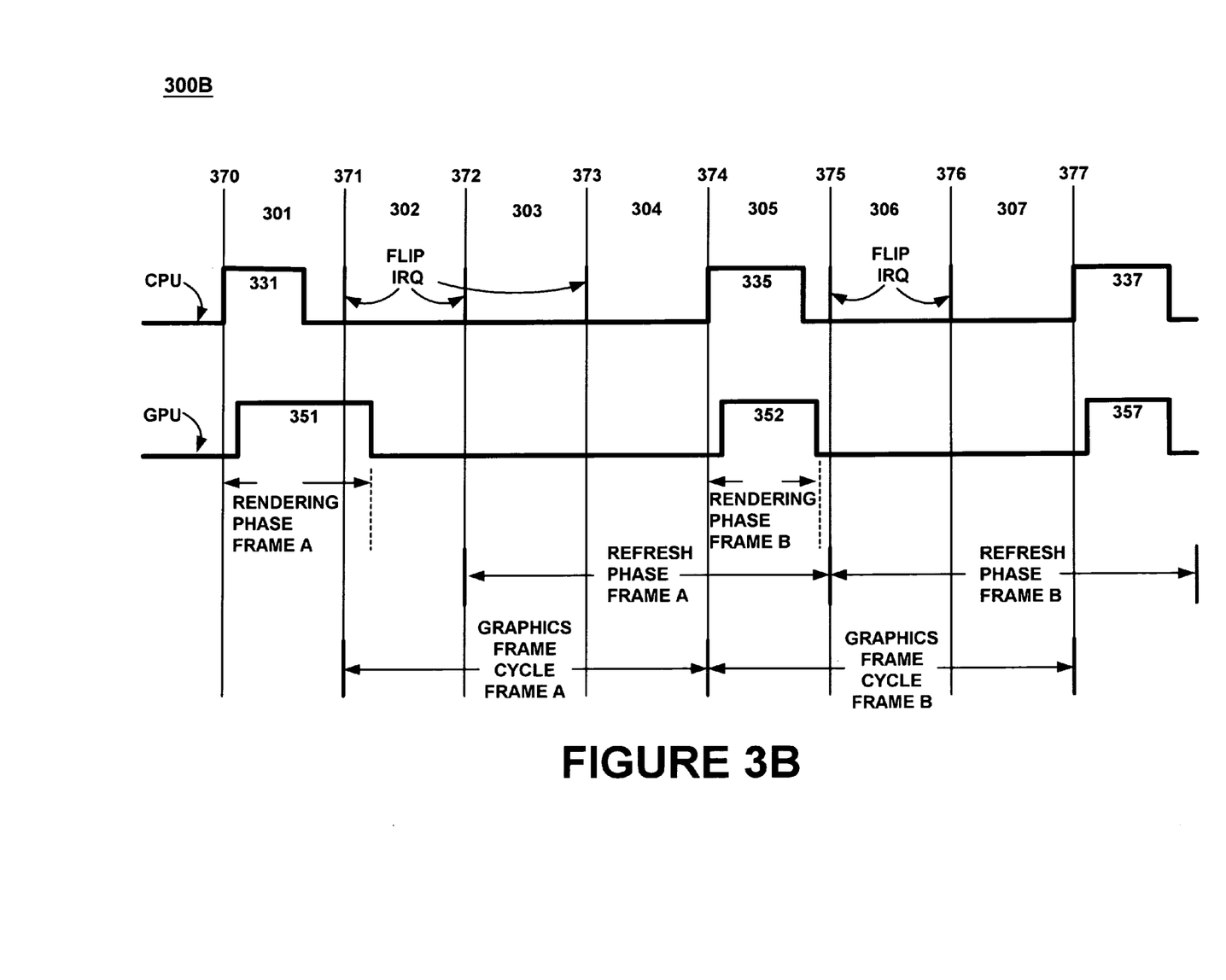
FIG. 3B is a timing diagram showing the relative occurrence of events in another exemplary implementation of the present invention.

FIG. 3B is a timing diagram showing the relative occurrence of events in another exemplary implementation of the present invention. The timing of events in FIG. 3B is similar the timing of events in FIG. 3A except it takes longer for the GPU to process the graphics command and communicate them to a buffer resulting in a longer rendering phase for frame A. Thus, the refresh phase for frame A and the display of frame A does not begin until the flip interrupt indicator at time 372. In one embodiment of the present invention, an interrupt handler that tracks the interrupt signal indicating that the GPU is ready for additional commands makes an adjustment for the shift of the graphics render phases. In one exemplary implementation, the interrupt hander does not start counting the frame flip interrupts until it gets a signal indicating that the GPU has finished it rendering processes and communicated the pixel data to the buffers. In another exemplary implementation, the graphics render phase does not shift and the CPU just gets one frame ahead.

Another feature of the present invention is the ability to adjust the ratio of rendering cycles to refresh cycles. Some applications do not need low rendering/refresh ratios and are capable of providing satisfactory performance at high ratios. Thus, the present invention enables the ratios to be increased resulting in the CPU "sleeping" longer and permitting even greater power savings. In one embodiment of the present invention, the ratio is set by adjusting the count down of the refresh counter. In one exemplary implementation, the duration of the rendering phase changes while the duration of the frame cycle is ideally fixed resulting in a slightly varying "ratio", but it is sufficiently accurate for the purposes of putting the CPU to sleep and waking it up. In one embodiment, a display presents a graphical user interface for indicating the adjustment in said length of said frame cycle. For example, the graphical user interface includes a slider scale between maximized performance (e.g., rapid rendering) on one end and maximized power savings (e.g., battery life) on the other end.

Thus, the present invention provides a flexible and efficient system and method for conserving power during graphics processing procedures. The CPU is put into a power savings mode in which it is asleep for most of the a graphics frame cycle and it does not expend precious power resources constantly polling a graphics processor to determine if the graphics processor has finished processing and rendering data for a graphics image.

In turn the present invention facilitates longer performance capabilities by systems with limited power source by reducing CPU power consumption associated with graphics activities.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A graphics power management method comprising:
   loading a first set of commands from a central processing unit (CPU) into a graphics processing unit (GPU) at the beginning of a frame cycle;
   putting said CPU to sleep after said loading of said first set of commands without putting said GPU to sleep; and
   waking said CPU up at end of said frame cycle to begin loading a second set of commands.

2. The graphics frame cycle management method of claim 1 further comprising:
   activating said CPU at beginning of a refresh cycle to check a counter;
   placing said CPU back to sleep if said counter does not indicate said frame cycle complete; and
   beginning said second set of commands if said counter indicates said frame cycle complete.

3. The graphics frame cycle management method of claim 2 wherein said activating utilizes an interrupt.

4. The graphics frame cycle management method of claim 3 wherein said interrupt is generated in relation to a display's vertical retrace signal.

5. The graphics frame cycle management method of claim 1 further comprising adjusting the length of said frame cycle by adjusting the number of times a counter value changes within said frame cycle.

6. The graphics frame cycle management method of claim 5 further comprising presenting a graphical user interface that can affect an initial value of said counter.

7. The graphics frame cycle management method of claim 5 further comprising presenting a graphical user interface for indicating the adjustment in said length of said frame cycle.

8. The graphics frame cycle management method of claim 7 wherein said graphical user interface includes a slider scale between maximized performance on one end and maximized power savings on the other end.

9. The graphics frame cycle management method of claim 1 wherein putting said CPU to sleep comprises putting to sleep an application thread running on the CPU after said application thread generates said first set of commands.

10. The graphics frame cycle management method of claim 1 wherein said processing of said first set of commands takes less time than a refresh cycle.

11. The graphics frame cycle management method of claim 1 wherein said processing of said first set of commands takes more time than a refresh cycle.

12. A power savings computer system comprising:
   a bus for communicating information;
   a graphics subsystem coupled to said bus, said graphics subsystem performs graphics operations; and
   a central processor coupled to said bus, said central processor goes into a sleep mode after providing graphics commands to said graphics subsystem while said graphics subsystem does not sleep and said central processor awakes after receiving an indication that said graphics subsystem is finished processing said graphics commands.

13. The power savings computer system of claim 12 further comprising:
   a plurality of graphics buffers for storing graphics information retrieved by a display monitor; and
   a graphics processor coupled to said plurality of graphics buffers and said central processor, said graphics processor processes graphics commands from said central processor and provides the resulting data to said plurality of graphics buffers.

14. The power savings computer system of claim 12 wherein said graphics processor forwards an interrupt to said central processor indicating that said central process should awaken.

15. The power savings computer system of claim 14 wherein said interrupt is a frame buffer flip request interrupt.

16. The power savings computer system of claim 14 wherein said central processor wakes up briefly to count said interrupt and after a predetermined number of interrupts said central processor begins forwarding additional graphics commands.

17. The power savings system of claim 16 further comprising presenting a graphical user interface for adjusting said predetermined number of said interrupts.

18. The power savings system of claim 17 wherein said graphical user interface includes a slider scale between maximized performance on one end and maximized power savings on the other end.

19. A power savings computer system comprising:
   a means for supplying graphics commands;
   a means for putting said means for supplying graphics commands into a power savings mode when said means for supplying graphics commands completes sending said graphics commands without putting a means for performing graphics processing into power savings mode; and
   a means for triggering an initiation of a normal power mode.

20. The power savings computer system of claim 19 further comprising a means for counting interrupts to determine when said initiation of said normal power mode should begin.

21. The power savings computer system of claim 19 further comprising a means for adjusting the time period said means for supplying graphics commands remains in said power savings mode.

* * * * *